(12) United States Patent
Brown et al.

(10) Patent No.: US 8,571,971 B1
(45) Date of Patent: Oct. 29, 2013

(54) CREDIT APPLICATION STATUS MONITOR

(75) Inventors: David H. Brown, Fair Oaks Ranch, TX (US); Shelley I. Stadler, San Antonio, TX (US); Donald E. Wratislaw, San Antonio, TX (US); Joy M. Wyche, San Antonio, TX (US)

(73) Assignee: Wells Fargo Bank, N.A., San Francisco, CA (US)

( * ) Notice: Subject to any disclaimer, the term of this patent is extended or adjusted under 35 U.S.C. 154(b) by 2586 days.

(21) Appl. No.: 10/126,013

(22) Filed: Apr. 19, 2002

(51) Int. Cl.
*G06Q 40/00* (2012.01)

(52) U.S. Cl.
USPC ............................................. 705/38; 705/35

(58) Field of Classification Search
USPC ...................................................... 705/35, 38
See application file for complete search history.

(56) References Cited

U.S. PATENT DOCUMENTS

| | | | |
|---|---|---|---|
| 4,774,664 A | 9/1988 | Campbell et al. | 364/408 |
| 5,218,539 A | 6/1993 | Elphick et al. | 364/419 |
| 5,239,462 A | 8/1993 | Jones et al. | 364/408 |
| 5,274,547 A | 12/1993 | Zoffel et al. | 364/408 |
| 5,611,052 A | 3/1997 | Dykstra et al. | 395/238 |
| 5,699,527 A | 12/1997 | Davidson | 395/238 |
| 5,774,882 A | 6/1998 | Keen et al. | 705/38 |
| 5,797,133 A | 8/1998 | Jones et al. | 705/38 |
| 5,870,721 A | 2/1999 | Norris | 705/38 |
| 5,878,403 A * | 3/1999 | DeFrancesco et al. | 705/38 |
| 5,926,792 A | 7/1999 | Koppes et al. | 705/4 |
| 5,930,776 A | 7/1999 | Dykstra et al. | 705/38 |
| 5,940,812 A | 8/1999 | Tengel et al. | 705/38 |
| 5,995,947 A * | 11/1999 | Fraser et al. | 705/38 |
| 6,014,645 A | 1/2000 | Cunningham | 705/38 |
| 6,021,202 A | 2/2000 | Anderson et al. | 380/25 |
| 6,029,149 A | 2/2000 | Dykstra et al. | 705/38 |
| 6,088,686 A | 7/2000 | Walker et al. | 705/38 |
| 6,209,095 B1 | 3/2001 | Anderson et al. | 713/176 |
| 6,904,412 B1 * | 6/2005 | Broadbent et al. | 705/38 |
| 2001/0029482 A1 * | 10/2001 | Tealdi et al. | 705/38 |
| 2003/0033241 A1 * | 2/2003 | Harari | 705/38 |
| 2003/0036994 A1 * | 2/2003 | Witzig et al. | 705/38 |

\* cited by examiner

*Primary Examiner* — Samica L Norman
(74) *Attorney, Agent, or Firm* — K&L Gates LLP

(57) ABSTRACT

A management system and method for a credit decision-making process. The system and method provide access to an automatically generated and updated status report providing information about conditions required for final credit approval. The status report is available via computer systems used by parties to the credit decision-making process, such as the potential borrower, the creditor, and a business partner working with the potential borrower and creditor. Notifications of changes to the status report and/or updated status reports are automatically provided to the parties via the computer systems. In some embodiments, a request for the current status report can be requested in response to the notification. The system and method also include the capability to access dates scheduled for fulfilling the conditions for final credit approval and to allow requests for changes to the scheduled dates. Notifications of requests for date changes can be automatically provided to all parties needing the information.

12 Claims, 7 Drawing Sheets

CREDIT APPLICATION STATUS MONITOR

CROSS-REFERENCE TO RELATED APPLICATIONS

This application relates to application Ser. No. 10/125,889, filed on same day herewith, entitled "Automatic Credit Application Form Completion Using Information From A Credit Report" and naming as inventors David H. Brown, Shelley I. Stadler, and Donald E. Wratislaw, the application being incorporated herein by reference in its entirety.

BACKGROUND OF THE INVENTION

1. Field of the Invention

This invention pertains to computerized information management and processing systems generally, and more particularly to a system and method for managing information for a credit decision-making process.

2. Description of the Related Art

Many credit decisions involve a creditor; a customer of the creditor who wishes to receive a loan of money or a line of credit to make a purchase of an item of property (herein "potential borrower" and "property," respectively), e.g., of a house; and a business partner, such as a mortgage broker. The creditor, potential borrower, and business partner work together for the creditor to extend credit to the potential borrower. A loan approval is used herein as an example of a type of credit decision requiring multiple parties to communicate information related to the potential borrower, the property, and types of credit that can be extended. Herein, the term "potential borrower" includes both natural and legal persons, such as a corporation. The term "creditor" refers to any credit decision-making institution and/or any entity designated by such an institution to perform credit decision-making functions on the institution's behalf. "Business partner" refers to a business partner, such as a mortgage broker or realtor, with which the creditor and/or potential borrower work to facilitate the credit decision-making process.

Such credit decision-making requires the creditor to collect information, such as information about the property that the potential borrower wishes to purchase and information about the potential borrower to render a decision as to his or her creditworthiness and thus final approval of the loan. In addition, the credit decision-making process includes making at least part of the information obtained during the loan approval process available to creditor personnel, the business partner, and the potential borrower.

Such credit decision-making generally also requires that the creditor impose conditions on approving the loan, such as requiring proof of employment and/or income. Several rounds of intermediate approvals may occur before a final credit approval is made; for example, there may be a conditional loan approval when the potential borrower meets certain credit conditions, and additional approvals of the property to be purchased, such as a title report approval. The term "final credit approval" is used herein to indicate the last approval in the credit decision-making process. The final credit approval leads to a legal offer to the loan applicant that forms a binding contract upon acceptance. Such credit decision-making includes scheduling certain events to occur for the purchase for which the loan is made to be closed, such as the satisfaction of specific conditions and the closing date itself.

The process described above is generally handled by a variety of creditor personnel, the business partner, and the potential customer, using a variety of paper forms, computer systems, software programs, and computer operators (e.g., for entering data into a computer).

The information, conditions, and schedule may be reviewed by several people, entered into various computer systems, and presented in various written or printed formats. As a result, confidentiality may become a problem as dissemination of the information increases and, as more people are involved in the evaluation process, the likelihood of human error increases. In addition, when the data are entered into various computer systems, problems with inconsistency and inefficiency may arise.

Furthermore, for the people involved in the process, generally no single location, document, computer software program, or other source exists at which all the information pertinent to any given person involved in the process can be accessed. In addition, there is generally no single means by which a given person involved in the process is notified of changes to the items of information that are pertinent to that person. That person generally has to ask to be made aware of changes or is notified by telephone call or letter. Also, there is generally no convenient way for the people involved in the process to request changes to the schedule of events, making all of the other people who need to be involved in such a change aware of the request.

What is needed is an integrated credit decision-making process that allows the people involved in the credit decision-making process to provide much or all of the information available to him or her into a central repository or repositories for the information used to make a final credit decision; to access the information pertinent to their role in the process; to be made aware of changes to items of information that are pertinent to them; and to make requests for changes in the scheduling of events to the other people involved in the scheduling of those events.

SUMMARY OF THE INVENTION

The present invention provides a management system and method for information pertaining to a credit decision-making process. The present invention provides access to an automatically generated and automatically updated status report providing information about conditions required for final credit approval. This information about conditions for final credit approval may include an identification of a person responsible for each condition, as well as a date by which the condition must be met. The status report is available via computer systems used by parties to the credit decision-making process, such as the potential borrower, the creditor, and a business partner working with the potential borrower and creditor. Notifications of changes to the status report and/or updated status reports are automatically provided to the parties via the computer systems. In some embodiments, a request for the current status report can be made in response to the notification.

The present invention also includes the capability to provide access to dates scheduled for fulfilling the conditions for final credit approval and allow requests for changes to the scheduled dates. Notifications of requests for changes can be automatically provided to all parties needing the information.

In one feature, the invention includes a computer-implemented method comprising generating a first status report comprising status information for at least one condition to make a final credit decision; obtaining information indicating that a status of a first condition has changed; automatically generating a second status report from the first status report, wherein the second status report indicates that the status of the first condition has changed; and automatically providing the second status report to a first computer system.

In one embodiment, the computer-implemented method further includes automatically sending a first message to the first computer system in response to generating the second status report and receiving a second message from the first computer system in response to the first message. Automatically providing the second status report is performed in response to receiving the second message.

In another embodiment, the method further includes automatically displaying the second status report on a display device associated with the first computer system.

In yet another embodiment, the method further includes obtaining a scheduled date for fulfillment of a second condition; automatically generating a third status report from the second status report, wherein the third status report includes the scheduled date; automatically providing the third status report to one or both of the first computer system and a second computer system; receiving a request to change the date from the first computer system or the second computer system; and automatically providing the request to the other computer system.

In another feature, the present invention includes a computer readable medium comprising computer instructions for generating a first status report comprising status information for at least one condition to make a final credit decision; obtaining information indicating that a status of a first condition has changed; automatically generating a second status report from the first status report, wherein the second status report indicates that the status of the first condition has changed; and automatically providing the second status report to a first computer system.

In yet another feature, the present invention includes a system including a first generating module for generating a first status report comprising status information for at least one condition to make a final credit decision; an obtaining module for obtaining information indicating that a status of a first condition has changed; a second generating module for automatically generating a second status report from the first status report, wherein the second status report indicates that the status of the first condition has changed; and a providing module for automatically providing the second status report to a first computer system.

In still another feature, the present invention includes a computer system comprising a processor and a memory comprising instructions. The processor executes the instructions, which include property receiving instructions for receiving information about a property, potential borrower receiving instructions for receiving information about a potential borrower, condition receiving instructions for receiving at least one condition for extending credit to the potential borrower, generating instructions for generating a first status report for the at least one condition available for access by at least one of the business partner and the potential borrower, and sending instructions for sending a notification to at least one of the business partner and the potential borrower in the event of a change in the first status report of the specified condition, the change producing a second status report, wherein the notification comprises an Internet address at which the second status report can be accessed.

In another feature, the present invention includes a computer system comprising a processor and a memory comprising instructions. The processor executes the instructions, which include first generating instructions for generating a first status report comprising status information for at least one condition to make a final credit decision; obtaining instructions for obtaining information indicating that a status of a first condition has changed; second generating instructions for automatically generating a second status report from the first status report, wherein the second status report indicates that the status of the first condition has changed; and providing instructions for automatically providing the second status report to a first computer system.

In still another feature, the present invention includes a system comprising first generating means for generating a first status report comprising status information for at least one condition to make a final credit decision; obtaining means for obtaining information indicating that a status of a first condition has changed; second generating means for automatically generating a second status report from the first status report, wherein the second status report indicates that the status of the first condition has changed; and providing means for automatically providing the second status report to a first computer system.

In another feature, the present invention includes an apparatus comprising a first generating circuit for generating a first status report comprising status information for at least one condition to make a final credit decision; an obtaining circuit for obtaining information indicating that a status of a first condition has changed; a second generating circuit for automatically generating a second status report from the first status report, wherein the second status report indicates that the status of the first condition has changed; and a providing circuit for automatically providing the second status report to a first computer system.

The foregoing is a summary and this contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

The use of the same reference number throughout the Figures designates a like or similar element.

Figure 1:
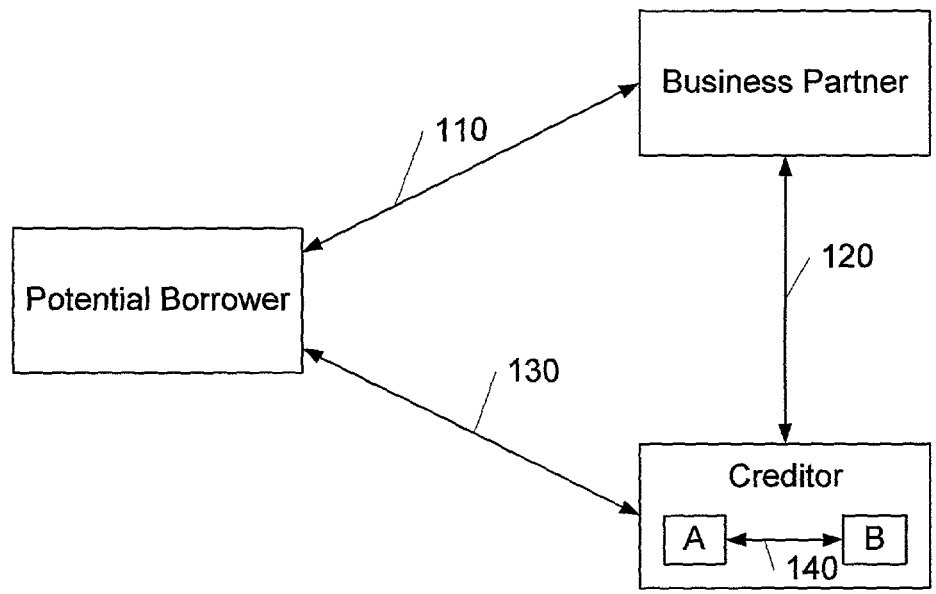
FIG. 1 is a block diagram generally showing the flows of information between parties involved in a final credit decision-making process.

While the invention is susceptible to various modifications and alternative forms, specific embodiments thereof are shown by way of example in the Drawings and will herein be described in detail. It should be understood, however, that the Drawings and Detailed Description are not intended to limit the invention to the particular form disclosed. On the contrary, the intention is to cover all modifications, equivalents, and alternatives falling within the scope of the present invention as defined by the appended Claims.

DETAILED DESCRIPTION

For a thorough understanding of the subject invention, reference may be had to the following Detailed Description, including the appended Claims, in connection with the above-described Drawings.

Although the present invention is described in connection with several embodiments, the invention is not intended to be limited to the specific forms set forth herein. On the contrary, it is intended to cover such alternatives, modifications, and equivalents as can be reasonably included with in the scope of the invention as defined by the appended Claims.

The present invention provides a management system and method for information pertaining to a credit decision-making process. The present invention provides access to an automatically generated and automatically updated status report providing information about conditions required for final credit approval. This information about conditions for final credit approval may include an identification of a person responsible for each condition, as well as a date by which the condition must be met. The status report is available via computer systems used by parties to the credit decision-making process, such as the potential borrower, the creditor, and a business partner working with the potential borrower and creditor. Notifications of changes to the status report and/or updated status reports are automatically provided to the parties via the computer systems. In some embodiments, a request for the current status report can be made in response to the notification.

An embodiment of the present invention utilizes at least in part the Internet. The Internet is a vast system of computers and computer networks that are interconnected through communications links. The interconnected computers exchange information, which may include information concerning purchases.

One component of the Internet is the World Wide Web (herein also "the Web"), which is a globally connected network that includes multiple Web "pages." Web pages are collections of information that can be viewed or otherwise generally accessed by a user through the use of browser software. Browser software is sometimes referred to herein as "a browser." A browser is a special-purpose software application program that performs the requesting and displaying of Web pages through a communications link.

A Web page can incorporate various multimedia components including text, graphics, sounds, including music and speech, animation, and video images. Web pages that include sound components can be heard as well as seen using a browser. The Web operates on a client/server model. The Web allows a server computer system to send graphical Web pages of information to a remote client computer system. A server computer system ("server system" or "server") includes a hardware server as well as software Web pages that make up a Web "site." The terms for the hardware "server" and the "site" are sometimes used interchangeably.

The remote client computer system can display Web pages because it includes a browser. A user runs Web client browser software such as Netscape Navigator™ or Microsoft's Internet Explorer™ on the user's computer. The browser software acts as a client that contacts a Web server and requests information or resources. The Web server locates and then sends the information to the Web browser, which displays the results to the user on the user's computer.

The phrases "using the Internet," "over the Internet," "via the Internet," and phrases of similar meaning, are used herein to refer to the use of communications links and computing resources that are formed in part by resources that one skilled in the art will recognize as part of the Internet. Such use herein of these phrases includes, but is not limited to, the use of communications links that are formed in part from elements of telephone systems, e.g., phone lines, routers, asynchronous transfer mode switches, satellites, and satellite uplinks and downlinks. Such use herein of these phrases is not limited to, although it does not exclude, the use of communications links that are formed solely by resources that one skilled in the art will recognize as part of the Internet.

In one embodiment, the potential borrower, the business partner, and the creditor are users of the Internet, and information pertaining to a credit decision-making process is provided at least in part at one or more Web pages.

FIG. 1 depicts an example of information flows involved in the process of a creditor making a loan to a potential borrower. During the credit decision-making process, a potential borrower provides information and makes and responds to requests from a creditor, as shown in information flow 130. Optionally, a third party business partner can be also involved in this information exchange, such as a mortgage broker or a realtor. Information may be exchanged between the potential borrower and the business partner, as shown in information flow 110, and between the business partner and the creditor, as shown in information flow 120. Also shown is an exemplary exchange of information requests and/or responses, labeled information flow 140, between two creditor personnel or organizations, labeled A and B, within the creditor. In some embodiments, no business partner is involved and the creditor and potential borrower communicate directly. In other embodiments, the creditor may be represented by a number of blocks associated with creditor personnel, field representatives, or departments.

Herein, unless otherwise specified, creditor personnel, field representatives of the creditor, and different organizations within the creditor are referred to collectively as "the creditor." These flows of information, requests and responses generally take place by a variety of media, such as the physical transfer of paper forms, letters, and notes; telephone calls and personal conversations; computer-based communications such as e-mails and accesses to Web pages or other software using computer systems; and the automated transfer of information between computer systems in which information related to the process is stored.

For example, the creditor may set conditions required for approval for the loan, decide whether to approve the loan, change the decision whether to approve the loan, change the type of loan offered to the customer, and update the status of a given condition when information related to the given condition is received, reviewed, or approved. The potential borrower and/or the business partner may set an initial closing date for the property, request a change to the closing date, request a change to the loan conditions or the type of loan, and provide information fulfilling a given condition.

Figure 2:
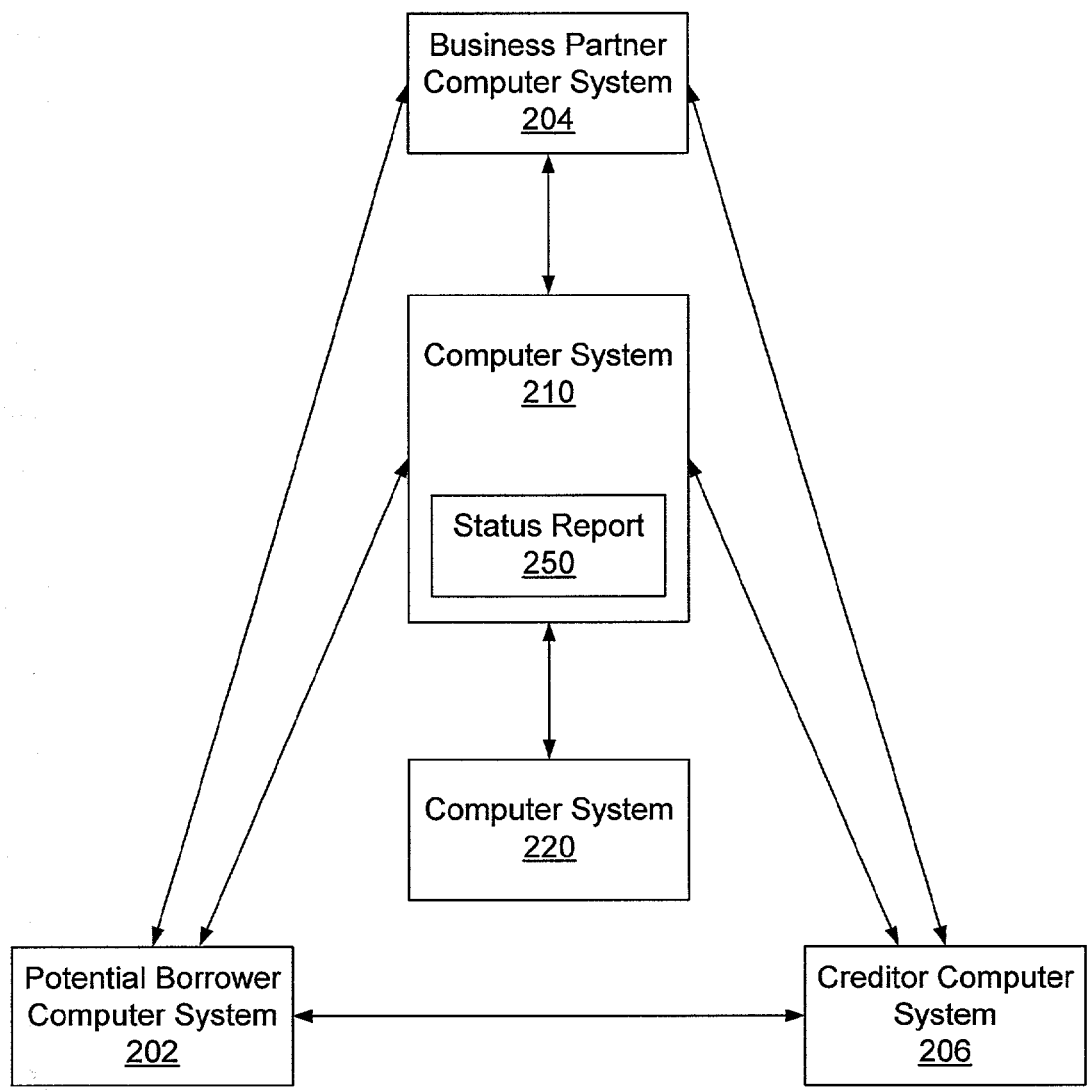
FIG. 2 shows information flows between computer systems used by the creditor, potential borrower, and business partner in a computer-implemented method and/or system corresponding to an embodiment of the invention.

FIG. 2 shows information flows between computer systems used by the creditor, potential borrower, and business partner in a computer-implemented method and/or system corresponding to an embodiment of the invention. In this example, a computer system such as computer system 210 receives information pertinent to the credit decision-making process from potential borrower computer system 202 associated with the potential borrower, business partner computer system 204 associated with the business partner, and creditor computer system 206 associated with the creditor. Computer system 210 shows that, in one embodiment of the invention, a central computer system can be used to facilitate communication between the various computer systems 202, 204 and 206 involved in the credit decision-making process. In other embodiments, the creditor computer system 206 may serve as a repository for the information regarding the credit decision-making process, and computer systems 210 and 220 may not be involved. In still other embodiments, a distributed network of computer systems may provide the functionality available from a central computer system, creditor computer system 206, or both.

In the example shown in FIG. 2, computer system 210 receives information from potential borrower computer system 202 about the potential borrower's financial situation. Computer system 210 also receives information about the property to be bought with the loan (herein, "the property") from the creditor and/or business partner using respective creditor computer system 206 and business partner computer system 204. In addition, computer system 210 obtains conditions specified by the creditor using creditor computer system 206 for making the loan to the potential borrower.

Status report 250 corresponds to a compilation of information stored electronically either in computer system 210 or on one or more computer systems coupled to computer system 210, as illustrated by computer system 220. This information may include at least one of the conditions required for approval of the loan, such as a condition that a given piece of information must be supplied, reviewed, and approved by one or more personnel of the creditor. The information may also include information on the status of each condition. For example, the status may indicate that a given item of information such as employment verification has been supplied, reviewed, or approved. Furthermore, these conditions may include a responsible person for meeting each condition as well as a date by which the condition must be met for final credit approval.

Each item of information in status report 250 is capable of being accessed via a computer system by each of the people who have need to see the item to fulfill their role in the credit decision-making process. However, in one embodiment, not every item is available to every person. For instance, information pertaining to the business relationship between the business partner and creditor can be made inaccessible to the potential borrower, who has no need for that item to fulfill his or her role in the credit decision-making process.

When an item of information in status report 250 is changed, notification can be sent to the computer system corresponding to each person in the loan process who needs to have notification of the change. Where the person needing the information has supplied an e-mail address, the notification can be sent via e-mail, and the e-mail can contain a link to a World Wide Web page that the recipient of the e-mail can use to access the Web page using a browser. The Web page can display the changed item of information stored in status report 250 that is the subject of the notification.

Alternatively, a letter or other non-computer-based notification may be sent with either the changed item of information in status report 250 or notification that there has been a change and information about how to learn the details of the change. The information flows between computer system 210, computer system 220, potential borrower computer system 202, business partner computer system 204, and creditor computer system 206 are depicted by arrows.

In one embodiment, the information flows to and/or from computer system 210 and/or computer system 220 concerning status report 250 take place via the Internet. The invention, however, is not so limited, and information flows may be communicated via any type of network using any protocol or communication mechanism.

In one embodiment, computer systems such as computer systems 210 and 220 are server computer systems and/or computers operably coupled to server computer systems.

Figure 3:
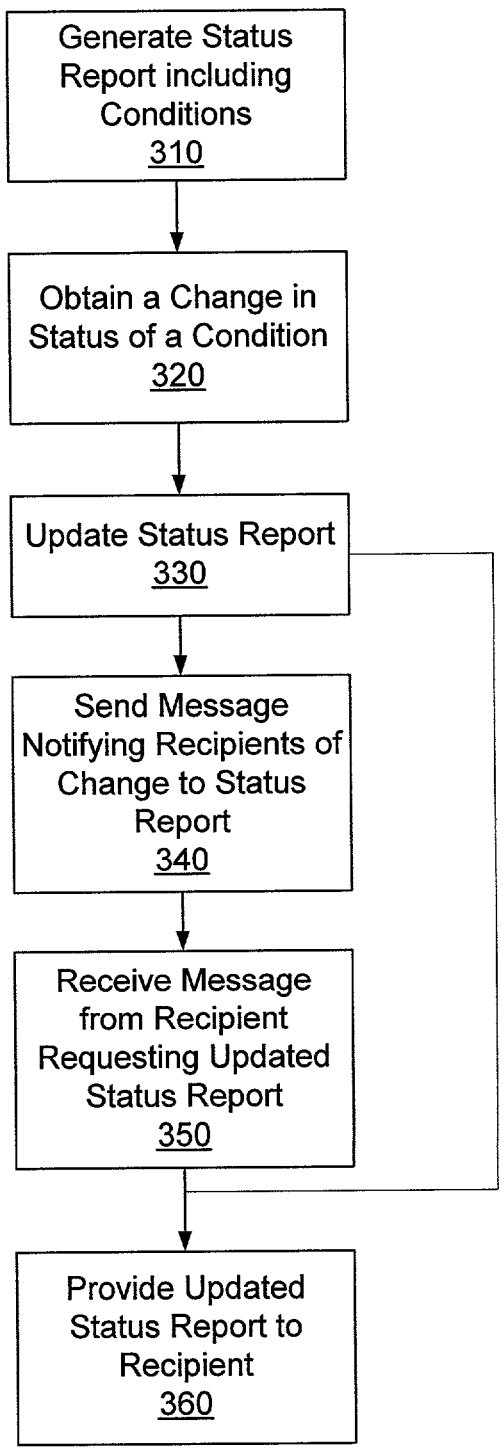
FIG. 3 is a flow chart showing automatically providing an updated status report upon determining that a status of a condition of final credit approval has changed.

FIG. 3 is a flow chart showing automatically providing an updated status report upon determining that a status of a condition of final credit approval has changed. In Generate Status Report Including Conditions step 310, a first status report is generated including each condition required for final credit approval and the status of the condition. The loan information, conditions and status for each condition may be stored electronically in a status report such as status report 250 of FIG. 2. In Obtain a Change in Status of a Condition step 320, a computer system such as computer system 210 of FIG. 2 obtains information that a change of status of a condition has occurred. In one embodiment, the change in status may be automatically provided to the computer system, and in another embodiment, the change in status may be determined by polling other computer systems or computer processes. The information about the change in the status is used to update the status report in Update Status Report step 330.

The updated status report may be provided automatically to all computer systems for persons needing information about the change in status, thereby skipping from Update Status Report step 330 directly to Provide Updated Status Report to Recipient step 360, as shown by the arrow from step 330 to step 360.

Alternatively, a message that the status report is updated may be provided to the persons involved, and the updated status report can be provided upon request. In Send Message Notifying Recipients of Change to Status Report step 340, a message, such as an e-mail message, is automatically sent to computer systems associated with persons involved in the credit decision-making process. In Receive Message from Recipient Requesting Updated Status Report step 350, a message requesting the updated status report is received from a recipient of the first message.

The updated status report is provided to at least one recipient in Provide Updated Status Report to Recipient step 360. As noted above, the updated status report may be provided directly to all computer systems for all persons involved in the credit decision-making process, or in response to the message received in Receive Message from Recipient Requesting Updated Status Report step 350. In one embodiment, the updated status report can be displayed as a web page on a display device of a computer system; in other embodiments, the updated status report may be provided as a file that can be viewed or in another computer-readable format.

One of skill in the art will recognize that each step of FIG. 3 may be implemented by computer instructions or by one or more software modules executable on the computer systems described in FIG. 2.

Figure 4:
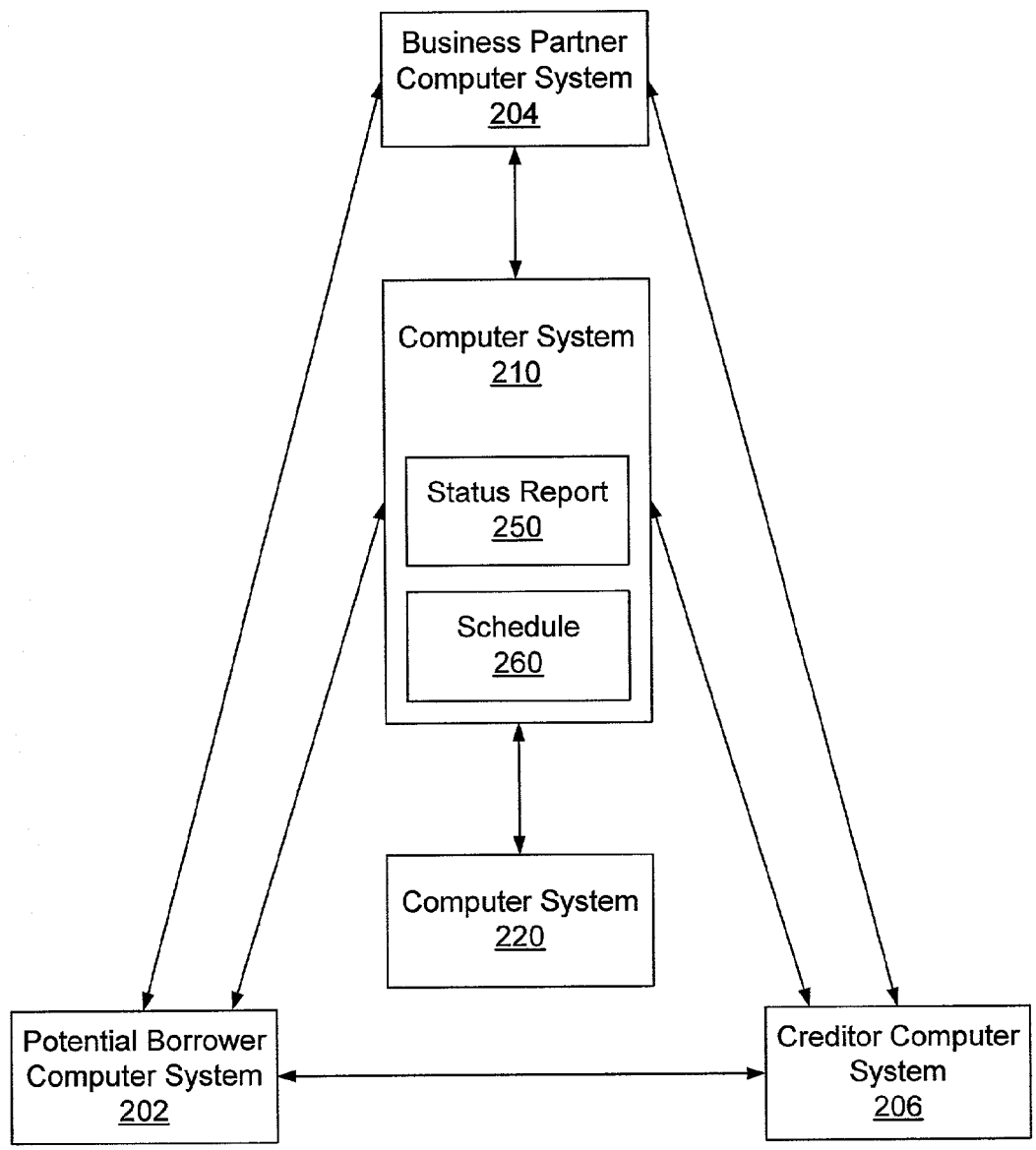
FIG. 4 shows information flows between the computer systems of FIG. 2 to update scheduled dates for conditions of final credit approval to be fulfilled.

FIG. 4 shows information flows between the computer systems of FIG. 2 to update scheduled dates for conditions of final credit approval to be fulfilled. In one embodiment, schedule information such as a scheduled date for a condition to be fulfilled is obtained by computer system 210 and/or computer system 220 and stored electronically as schedule 260 in central computer system 210 and/or computer systems 220. In addition, the schedule information may specify a responsible person for ensuring that each condition is met. In an alternative embodiment, the schedule information need not be stored separately and can be included within status report 250.

The scheduled date and/or responsible person are available for access by computer systems associated with at least the potential borrower and/or business partner, such as potential borrower computer system 202 and business partner computer system 204. If either the potential borrower or business partner wishes to request a change in the scheduled date, that person can send the request via a computer system to all other people involved in the process who need to be aware of such a request. If all request recipients agree, the scheduled date can be changed.

Figure 5:
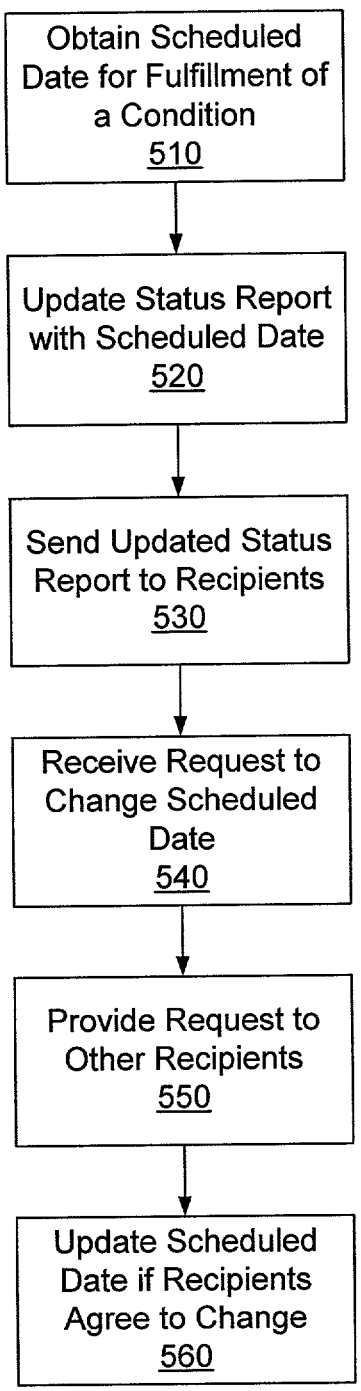
FIG. 5 is a flow chart of a process of updating a status report to include schedule information, such as scheduled dates for the conditions required for final credit approval.

FIG. 5 depicts a flow chart of a process of updating a status report to include schedule information, such as scheduled dates for the conditions required for final credit approval. FIG. 5 is described with reference to FIG. 2. At least one of computer system 210, computer system 220, creditor computer system 206, and business partner computer system 204 of FIG. 2 obtains the scheduled date for fulfillment of a given condition, as shown in Obtain Scheduled Date for Fulfillment of a Condition step 510. For example, a person using business partner computer system 204 may set a closing date for closing the loan on a property. The schedule information can be stored electronically in schedule 260 of FIG. 2, or it may be an item of information included in status report 250 that is updated, as shown in Update Status Report with Scheduled Date step 520. In either case, the status report and the schedule information for a given final credit decision can be accessed together.

The updated status report can be automatically sent to computer systems related to persons involved in the credit decision-making process, as previously described with reference to FIG. 3. A person involved in the process can access status report 250 and/or schedule 260 and wish to change a date set for fulfillment of a condition. In Receive Request to Change Scheduled Date, at least one of computer system 210, computer system 220, creditor computer system 206 and business partner computer system 204 receives a request for a change in the date set for fulfillment of a condition. Either the computer system receiving the request or the person wishing the change sends a request to all others involved in the process who need to be aware of such a request, as shown in Transmit Request to Other Recipients step 550. If the others agree, the date can be updated in the status report 250 and/or schedule 260.

One of skill in the art will recognize that each step of FIG. 5 may be implemented by computer instructions or by one or more software modules executable on the computer systems described in FIGS. 2 and 4.

In one embodiment, the information flows to and/or from computer systems 202, 204, 206, 210 and 220 regarding status report 250 and/or schedule 260 take place via the Internet.

In one embodiment, at least one of computer systems 202, 204, 206, 210 and 220 can be a server computer system and/or computer system operably coupled to a server computer system. Potential borrower system 202 may be a client computer system only.

Figure 6:
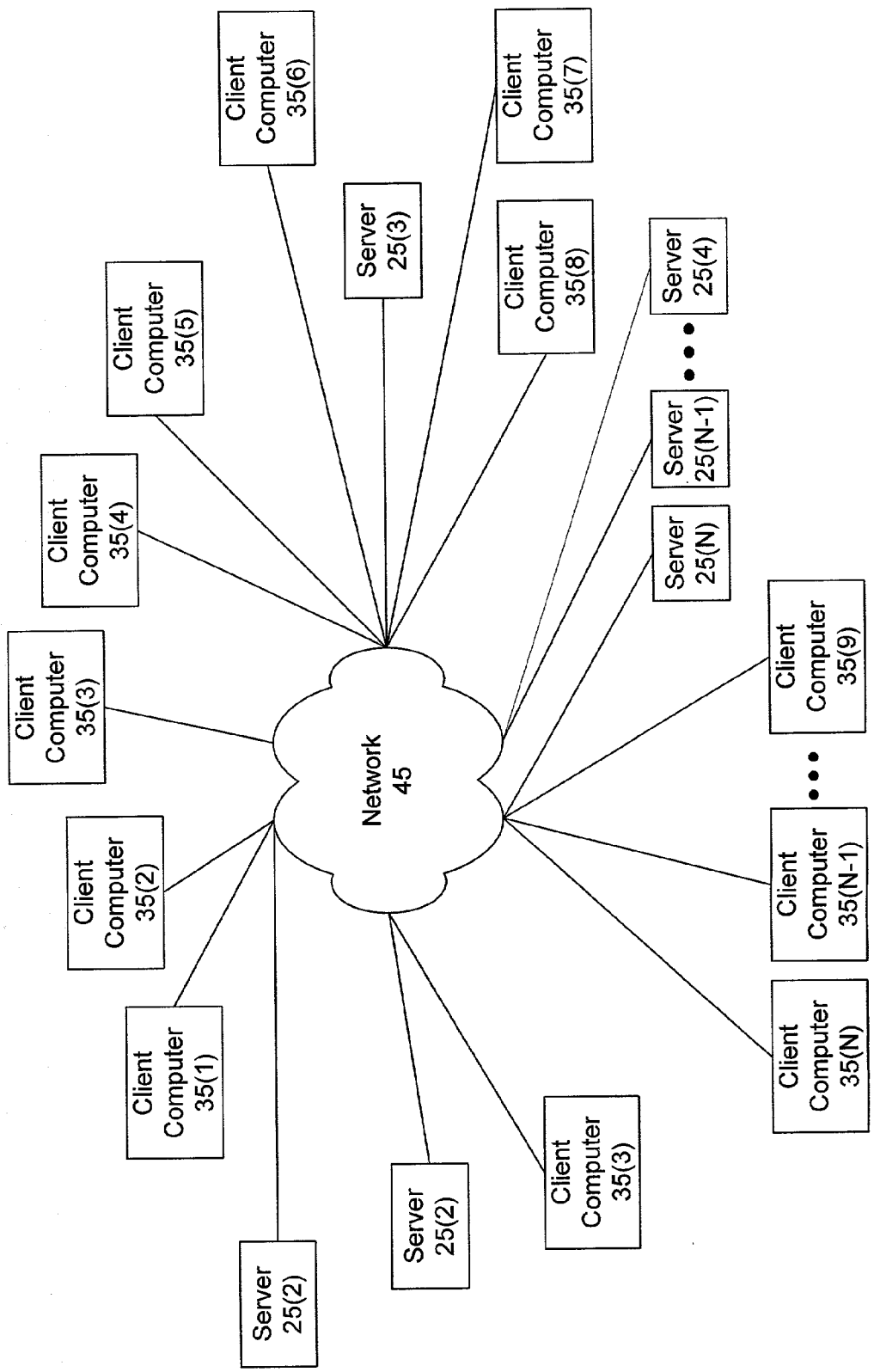
FIG. 6 is a block diagram illustrating a network environment in which the present invention may be practiced.

FIG. 6 is a block diagram illustrating a network environment in which the present invention may be practiced. The present invention is not limited to such a network environment and may be implemented using a variety of communication protocols and network architectures. As is illustrated in the example of FIG. 6, network 45, such as a private wide area network (WAN) or the Internet, includes a number of networked servers 25(1)-(N) that are accessible by client computers 35(1)-(N). Communication between client computers 35(1)-(N) and servers 25(1)-(N) typically occurs over a publicly accessible network, such as a public switched telephone network (PSTN), a DSL connection, a cable modem connection or large bandwidth trunks (e.g., communications channels providing T1 or OC3 service).

Client computers 35(1)-(N) access servers 25(1)-(N) through, for example, a service provider. An example of a service provider includes an Internet Service Provider (ISP) such as America On-Line™, Prodigy™, CompuServe™ or the like. Access is obtained by executing application-specific software (e.g., network connection software and a browser) on the given one of client computers 35(1)-(N). In one embodiment, this application-specific software includes software for providing a user interface for the credit application evaluation system.

As a result of using a publicly accessible network for network 45, client computers 35(1)-(N) and servers 25(1)-(N) can be distributed, for example, among one or more creditors, business partners, or potential borrowers. One of client computers 35(1)-(N) and one of servers 25(1)-(N) may be physically close, such as in the same creditor building, or physically distant, as when the client computer is located in the applicant's home or the office of a real estate agent or car salesman that is not the decision maker on the loan. The client computer serves as the data entry point for information about the potential borrower. Using a client computer, people involved in the credit decision-making process can refer to and retrieve information such as the status and schedule information discussed herein.

One or more of servers 25(1)-(N) may be distributed, for instance, across a group of lenders, such as branches of a creditor, creditors within a holding company, or other credit application evaluation entities under common ownership or sharing some other association. Alternatively, each server of servers 25(1)-(N) may be distributed across a group of service providers that are not affiliated in any way other than they all provide status and/or scheduling services.

The variable identifier "N" is used in several instances in FIG. 6 to more simply designate the final element (e.g., servers 25(1)-(N) and client computers 35(1)-(N)) of a series of related or similar elements (e.g., servers and client computers). The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified by "N" may hold the same or a different value than other instances of the same variable identifier.

One or more of client computers 35(1)-(N) and/or one or more of servers 25(1)-(N) may be, for example, a computer system of any appropriate design, in general, including a mainframe, a mini-computer or a personal computer system. Such a computer system typically includes a system unit having a system processor and associated volatile and non-volatile memory, one or more display monitors and keyboards, one or more diskette drives, one or more fixed disk storage devices and one or more printers. These computer systems are typically information handling systems which are designed to provide computing power to one or more users, either locally or remotely. Such a computer system may also include one or a plurality of input/output (I/O) devices (i.e., peripheral devices) which are coupled to the system processor and which perform specialized functions. Examples of I/O devices include modems, sound and video devices and specialized communication devices. Mass storage devices such as hard disks, CD-ROM drives and magneto-optical drives may also be provided, either as an integrated or peripheral device. One such example computer system is shown in detail in FIG. 7.

Figure 7:
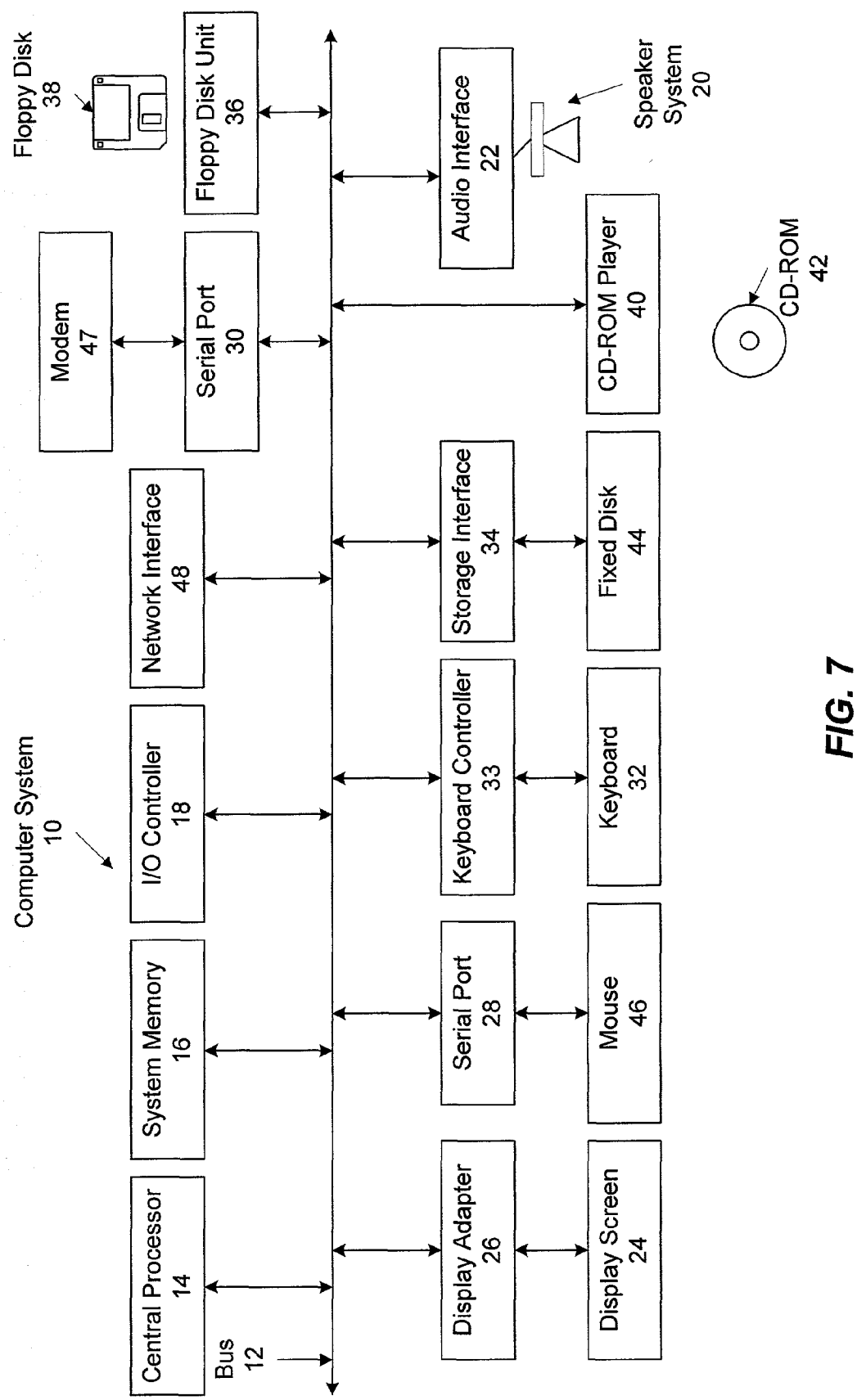
FIG. 7 depicts a block diagram of a computer system suitable for implementing the present invention.

FIG. 7 depicts a block diagram of a computer system 10 suitable for implementing the present invention and serves as an example of one or more of client computers 35(1)-(N) and/or servers 25(1)-(N). Computer system 10 includes a bus 12 which interconnects major subsystems of computer system 10 such as a central processor 14, a system memory 16 (typically RAM, but which may also include ROM, flash RAM, or the like), an input/output controller 18, an external audio device such as a speaker system 20 via an audio output interface 22, an external device such as a display screen 24 via display adapter 26, serial ports 28 and 30, a keyboard 32 (interfaced with a keyboard controller 33), a storage interface 34, a floppy disk unit 36 operative to receive a floppy disk 38, and a CD-ROM player 40 operative to receive a CD-ROM 42. Also included are a mouse 46 (or other point-and-click device, coupled to bus 12 via serial port 28), a modem 47 (coupled to bus 12 via serial port 30) and a network interface 48 (coupled directly to bus 12).

Bus 12 allows data communication between central processor 14 and system memory 16, which may include both read only memory (ROM) or flash memory (neither shown), and random access memory (RAM) (not shown), as previously noted. The RAM is generally the main memory into which the operating system and application programs are loaded and typically affords at least 16 megabytes of memory space. The ROM or flash memory may contain, among other code, the Basic Input-Output system (BIOS) which controls basic hardware operation such as the interaction with peripheral components. Application programs resident with computer system 10 are generally stored on and accessed via a computer readable medium, such as a hard disk drive (e.g., fixed disk 44), an optical drive (e.g., CD-ROM player 40), floppy disk unit 36 or other storage medium. Additionally, application programs may be in the form of electronic signals modulated in accordance with the application and data communication technology when accessed via network modem 47 or interface 48.

Storage interface 34, as with the other storage interfaces of computer system 10, may connect to a standard computer readable medium for storage and/or retrieval of information, such as a fixed disk drive 44. Fixed disk drive 44 may be a part of computer system 10 or may be separate and accessed through other interface systems. Many other devices can be connected such as a mouse 46 connected to bus 12 via serial port 28, a modem 47 connected to bus 12 via serial port 30 and a network interface 48 connected directly to bus 12. Modem 47 may provide a direct connection to a remote server via a telephone link or to the Internet via an internet service provider (ISP). Network interface 48 may provide a direct connection to a remote server via a direct network link to the Internet via a POP (point of presence). Network interface 48 may provide such connection using wireless techniques, including digital cellular telephone connection, Cellular Digital Packet Data (CDPD) connection, digital satellite data connection or the like.

When network 45 is the Internet, each of client computers 35(1)-(N) are able to access information on one or more of servers 25(1)-(N) using, for example, a web browser (not shown). An example of the type of information accessed includes the pages of a web site hosted on one of servers 25(1)-(N). Protocols for exchanging data via the Internet are well known to those skilled in the art. Although the examples herein describe the use of the Internet for exchanging data, the present invention is not limited to the Internet or to any particular network-based environment.

The web browser running on one of client computers 35(1)-(N) can employ a TCP/IP connection to pass a request to one of servers 25(1)-(N), which can run an HTTP (Hypertext Transfer Protocol) "service" (e.g., under the WINDOWS® operating system) or a "daemon" (e.g., under the UNIX® operating system), for example. Such a request can be processed, for example, by contacting an HTTP server employing a protocol that can be used to communicate between the HTTP server and the given client computer. The HTTP server then responds to the request, typically by sending a web page formatted as an HTML file. Preferably, a secure connection is used to accomplish this communication, such as HTTPS (HTTP over Secure Socket Layer), which encrypts and decrypts user page requests as well as the pages that are returned by the Web server. The web browser interprets the HTML file and may form a visual representation of the HTML file using local resources of the given client computer system, such as locally available fonts and colors.

Many other devices or subsystems (not shown) may be connected in a similar manner (e.g., bar code readers, document scanners, digital cameras and so on). Conversely, it is not necessary for all of the devices shown in FIG. 7 to be present to practice the present invention. The devices and subsystems may be interconnected in different ways from that shown in FIG. 7. The operation of a computer system such as that shown in FIG. 7 is readily known in the art and is not discussed in detail in this application. Code to implement the present invention may be stored in computer-readable storage media such as one or more of system memory 16, fixed disk 44, CD-ROM 42, or floppy disk 38. Additionally, computer system 10 may be any kind of computing device, and so includes a personal data assistants (PDA), network appliance, X-window terminal or other such computing device. The operating system provided on computer system 10 may be MS-DOS®, MS-WINDOWS®, OS/2®, UNIX®, Linux® or other known operating system. Computer system 10 also supports a number of Internet access tools, including, for example, an HTTP-compliant web browser having a JavaScript interpreter, such as Netscape Navigator®, Microsoft Explorer® and the like.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The present invention provides many advantages. The invention supports an integrated credit decision-making process that allows the people involved in the credit decision-making process to provide much or all of the information available to him or her into a central repository or repositories for the information used to make a final credit decision. Individual persons can access the information pertinent to their role in the process and be made aware of changes to items of information that are pertinent to them. In addition, people involved in the credit decision-making process can request approval of changes in the scheduling of events from the other people involved in the scheduling of those events.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing described embodiment shows different components contained within other components (e.g., the various elements shown as components of computer system 10). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of a fully functional computer system, however those skilled in the art will appreciate that the present invention is capable of being distributed as a program product in a variety of forms, and that the present invention applies equally regardless of the particular type of signal bearing media used to actually carry out the distribution. Examples of signal bearing media include: recordable type media such as floppy disks and CD-ROM, transmission type media such as digital and analog communications links, as well as media storage and distribution systems developed in the future.

The above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the spirit and scope of the invention.

Consequently, the invention is intended to be limited only by the scope of the appended claims, giving full cognizance to equivalents in all respects.

What is claimed is:

1. A computer system comprising:
a processor,
a computer readable medium for storing software modules executable by the processor, the software modules comprising:
a first module for generating a first status report comprising status information for a first condition that is necessary to be met before an application for financial credit can be approved;
an obtaining module for obtaining information indicating that a status of the first condition has changed;
a second generating module for automatically generating a second status report from contents of the first status report, wherein the second status report indicates that the status of the first condition has changed;
a sending module for automatically sending a first message to a first computer system in response to the generation of the second status report;
a receiving module for receiving a reply message from the first computer system;
a providing module for automatically providing the second status report to the first computer system in response to the receiving module receiving the reply message from the first computer system;
a third generating module for automatically generating a third status report using contents of the second status report, wherein the third status report comprises a scheduled date;
a second providing module for automatically providing the third status report to a plurality of computer systems, including the first computer system and a second computer system;
a second receiving module for receiving a request to change the date from the first computer system; and
a third providing module for automatically providing the request to the plurality of computer systems other than the first computer system.

2. The system of claim 1 further wherein the sending module automatically sends a second message to the second computer system in response to the generation of the second status report; and
- wherein the receiving module is configured to receive a reply message from the second computer system;
- wherein the providing module automatically provides the second status report to the second computer system in response to the receiving the second message.

3. The system of claim 1 wherein
the providing module automatically displays the second status report on a display device associated with the first computer system.

4. A computer system comprising:
- a processor; and
- a computer readable memory, the computer readable memory comprising instructions executable by the processor, the instructions comprising:
- instructions for generating a first, status report comprising status information for a first condition that is necessary to be met before an application for financial credit can be approved;
- instructions for obtaining information indicating that a status of the first condition has changed;
- instructions for automatically generating a second status report based on contents from the first status report, wherein the second status report indicates that the status of the first condition has changed;
- instructions for automatically sending a first message to a first computer system in response to generating the second status report; and
- instructions for receiving a reply message from the first computer system in response to sending the first message;
- instructions for automatically providing the second status report to the first computer systems in response to the receiving the reply message;
- instructions for automatically generating a third status report using contents of the second status report, wherein the third status report comprises a scheduled date;
- instructions for automatically providing the third status report to the plurality computer systems, including the first computer system and a second computer system;
- instructions for receiving a request to change the date from the first computer system;
- instructions for automatically providing the request to the plurality of computer systems other than the first computer system.

5. The computer system of claim 4 wherein the instructions further comprise:
- instructions for automatically sending a second message to the second computer system in response to the generating the second status report; and
- instructions for receiving a reply message from the second computer system in response to sending the second message;
- wherein the second status report is automatically provided to the second computer system in response to the receiving the reply message from the second computer system.

6. The computer system of claim 4 further comprising instructions for automatically displaying the second status report on a display device associated with the first computer system.

7. A computer system comprising:
- a first status report generated comprising status information for a first condition that is necessary to be met before an application for financial credit can be approved;
- information obtained indicating that a status of the first condition has changed;
- a second status report automatically generated from contents of the first status report, wherein the second status report indicates that the status of the first condition has changed;
- a first message automatically sent to a first computer system in response to the second status report generated; and
- a reply message received from the first computer system in response to the first message sent;
- the second status report automatically provided to the first computer system in response to the reply message received;
- a third status report automatically generated using contents of the second status report, wherein the third status report comprises a scheduled date;
- the third status report automatically provided to a plurality computer systems, including the first computer system and a second computer system;
- a request receieved to change the date from the first computer system; and
- the request automatically provided to the plurality of computer systems other than the first computer system.

8. The system of claim 7 wherein:
- a message is automatically sent to the second computer system in response to the generating the second status report; and
- a reply message is received from the second computer system;
wherein
the second status report is automatically provided to the second computer system in response to the reply message received from the second computer system.

9. The system of claim 7 wherein
the second status report is automatically displayed on a display device associated with the first computer system.

10. An apparatus comprising:
- a first generating circuit for generating a first status report comprising status information for a first condition that is necessary to be met before an application for financial credit can be approved;
- an obtaining circuit for obtaining information indicating that a status of the first condition has changed;
- a second generating circuit for automatically generating a second status report from the first status report, wherein the second status report indicates that the status of the first condition has changed;
- a sending circuit for automatically sending a first message to a first computer system in response to the generating the second status report;
- a receiving circuit for receiving a reply message from the first computer system in response to sending the first message;
- a providing circuit for automatically providing the second status report to the first computer system in response to the receiving the reply message;
- a third generating circuit for automatically generating a third status report using contents of the second status report, wherein the third status report comprises a scheduled date;

a second providing circuit for automatically providing the third status report to a plurality of computer systems, including the first computer system and a second computer system;

a second receiving circuit for receiving a request to change the date from the first computer system; and a third providing circuit for automatically providing the request to the plurality of computer systems other than the first computer system.

11. The apparatus of claim 10 further comprising:

a second sending circuit for automatically sending a second message to the second computer system in response to the generating the second status report; and a third receiving circuit for receiving a reply message from the second computer system in response to sending the second message;

wherein the providing circuit automatically provides the second status report to the second computer system in response to the receiving the reply message from the second computer system.

12. The apparatus of claim 10 wherein the second providing circuit automatically displays the second status report on a display device associated with the first computer system.

* * * * *